Aug. 20, 1935.  J. VEHKO  2,011,664
UNIT VEHICLE TOP EMBODYING FRONT AND SIDE QUARTER PANELS
Filed March 4, 1932
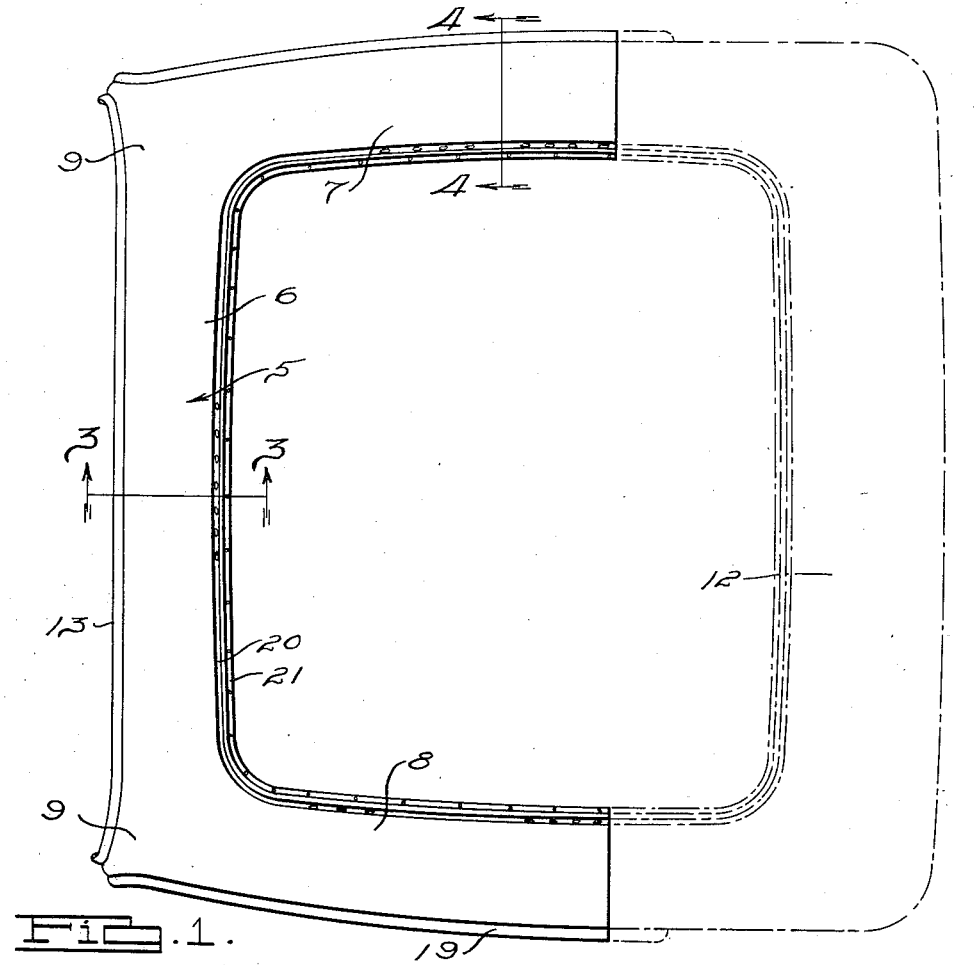
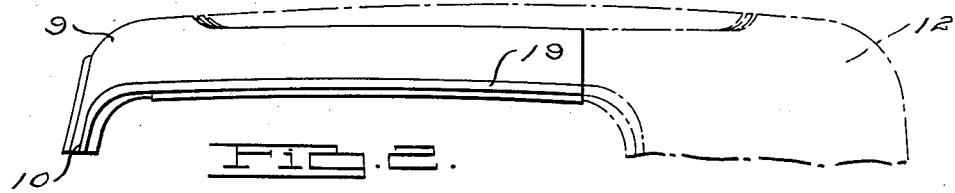
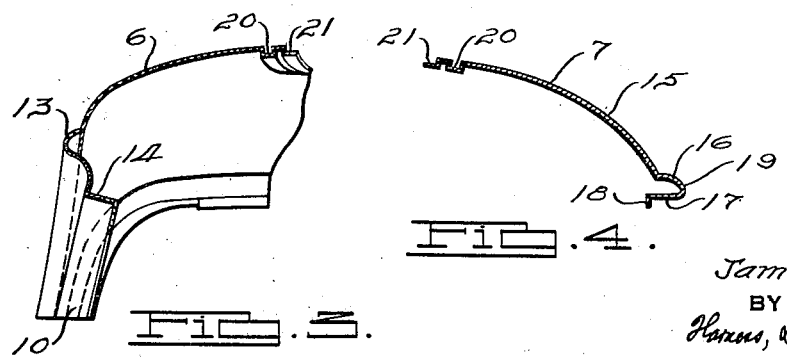
INVENTOR
James Vehko.
BY
Harness, Dickey, Pierce & Hann
ATTORNEYS.

Patented Aug. 20, 1935

2,011,664

UNITED STATES PATENT OFFICE 2,011,664

UNIT VEHICLE TOP EMBODYING FRONT AND SIDE QUARTER PANELS

James Vehko, Detroit, Mich., assignor to The Murray Corporation of America, a corporation of Delaware Application March 4, 1932, Serial No. 596,677

3 Claims. (Cl. 296—137)

My invention relates to vehicle body constructions and particularly to a sheet metal stamping therefor which embodies the header finish panel and the side finish quarter panels of the vehicle body.

It has been the practice in the art to form the header panel and the side quarter panels of a vehicle body as separate elements and unite them by welding or other means to form the top finish section of the vehicle.

My invention eliminates the welding operation between the side quarter finish panels and the header finish panel by stamping the header finish panel and side quarter panels from a single sheet of material to form a unit construction which considerably strengthens the top and materially reduces the manufacturing cost.

The main objects of my invention are: to construct the header and side quarter panels of a vehicle body from a single sheet of material; to preform the single sheet of material at the door and window openings so as to constitute a drip molding thereat; to preform the metal between the openings to constitute pillar elements; and to construct a top for a vehicle body of increased strength and reduced manufacturing cost which is of unit construction and economical of assembly.

Other objects and features of novelty of my invention will be either specifically pointed out or will become apparent when referring, for a better understanding of my invention, to the following description in conjunction with the accompanying drawing, wherein:

Figure 1 is a plan view of a unit element forming the header and quarter finish panels of a vehicle body which embodies features of my invention, Fig. 2 is a side view, in elevation, of the structure illustrated in Fig. 1, Fig. 3 is a sectional view of the structure illustrated in Fig. 1, taken on the line 3—3 thereof, and Fig. 4 is a sectional view of the structure illustrated in Fig. 1, taken on the line 4—4 thereof.

My invention comprises in general a stamped element 5 which embodies the finish header panel 6 and the side quarter finish panels 7 and 8 and which is preformed from a single sheet of material. The side quarter panels 7 and 8 join the header panels at the curved portion 9 which are extended downwardly, at 10, and preformed in such manner as to form the upper portion of the door and windshield pillar elements or pillar cover panels. This extended portion 10 is secured to the pillar or pillar cover panel by welding or by other means well known in the art to be suitable. The quarter panels 7 and 8 are welded or otherwise secured to the rear finish panel 12 of the vehicle, which is illustrated in dot and dash lines as being connected to the stamped element 5 to form the complete top and back construction of the vehicle body.

Referring to Fig. 3, which is a section through the header panel portion 6 of the element 5, it will be noted that the metal is outwardly formed at 13 above the window opening to constitute a finish bead which is utilized as a drain trough for conducting the water laterally across the panel 6 to prevent it from running downwardly over the windshield. It is to be understood that the windshield, preferably, is of arcuate shape at the top, although it may have its top edge horizontally disposed, to follow the lateral curvature of the bead 13 to enhance the appearance of the windshield construction and provide a lateral slope to the bead, or extension 13, to cause the water to drain laterally from each side of the center of the header panel. Below the bead 13 the metal extends inwardly and laterally, at 14, to form a sill for the windshield proper.

Referring to Fig. 4, I have illustrated a section through the side quarter panel 7 showing the arcuate lateral portion 15 thereof which is extended at 16 and reversely bent at 17 and flanged, at 18 along the top door opening, to form the drain extension 19 which projects laterally above the door opening at the lower edge of the quarter panels. The inner edge of the header and quarter panels is provided with a channel portion 20 and an angle portion 21 which is the common practice for securing a central top element to the top construction.

It is to be understood that the unit panel element 5 may be formed into other shapes than those herein particularly illustrated and described and provided with or without the drain extensions 13 and 19 to form drain troughs which may have the shape as shown or preformed further to provide a channel or trough therein. The primary object of my invention being the provision of a unit header finish panel and side quarter panels formed from a single sheet of metal having extensions between the windshield and door openings forming the side pillar elements or pillar cover panels of the vehicle body.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. A unit top construction for a vehicle body including a header finish panel and side quarter finish panels constructed from a single sheet of material and provided with preformed portions constituting the top edges, respectively, of the windshield and door openings, and having the material, extending between said openings, preformed to constitute pillar elements therebetween.

2. A single stamping preformed in a die to constitute the upper windshield ledge, the top header finish panel, the top door jambs and quarter panels at either side thereof, the metal between the quarter panels and header being preformed to constitute a portion of the front pillars, the top portion of the header and quarter panels being cut away to define the front portion of the top roof opening, the edges of which are rabbeted to receive the top material.

3. A single stamping preformed in a die to constitute the upper windshield ledge, the top header finish panel, the top door jambs and quarter panels at either side thereof, the metal between the quarter panels and header being preformed to constitute a portion of the front pillars, the top portion of the header and quarter panels being cut away to define the front portion of the top roof opening, the edges of which are rabbeted to receive the top material, the side quarter panels being extended outwardly in the vicinity of the door jambs to constitute drip moldings.

JAMES VEHKO.